United States Patent Office 3,397,908
Patented Aug. 20, 1968

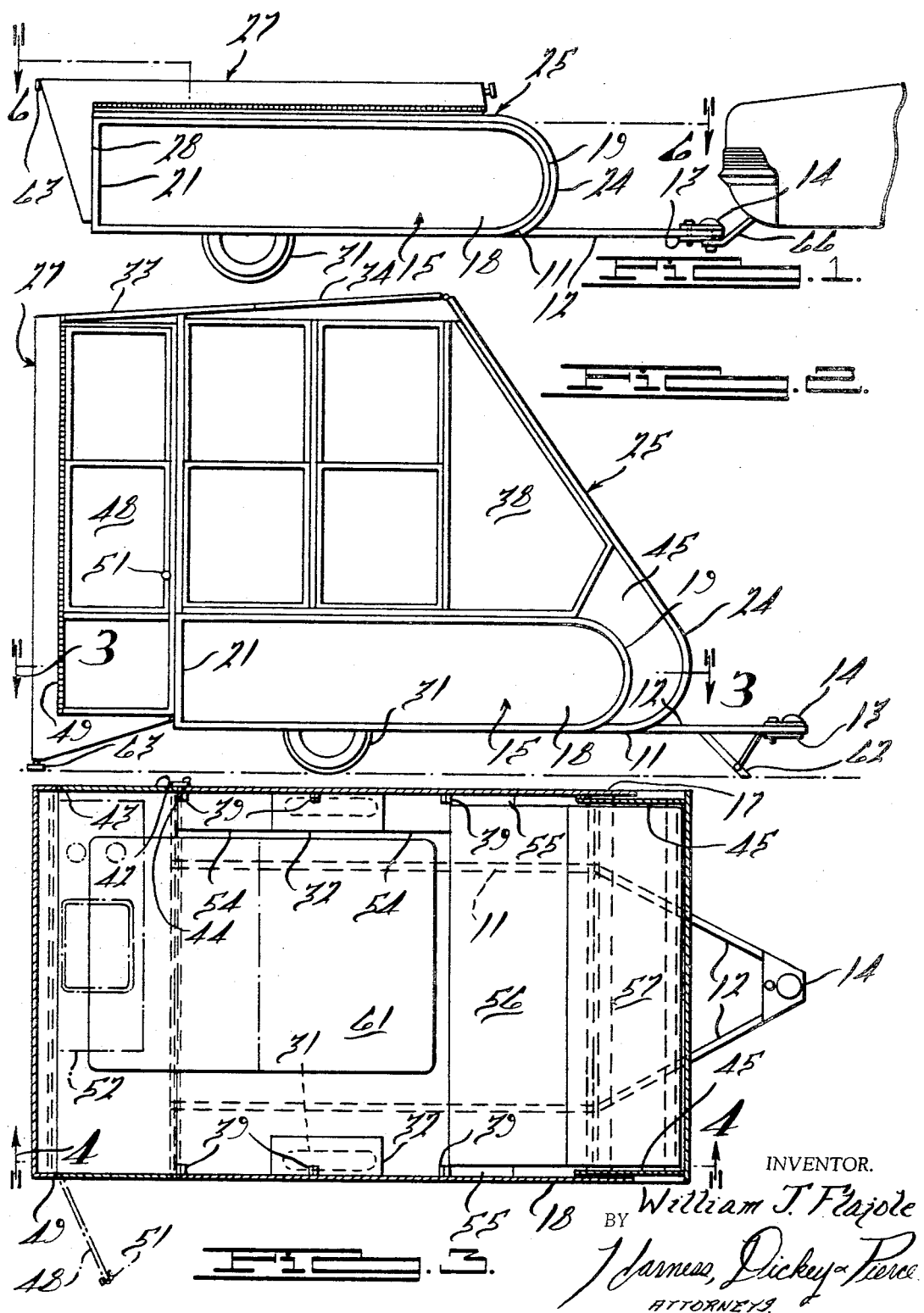

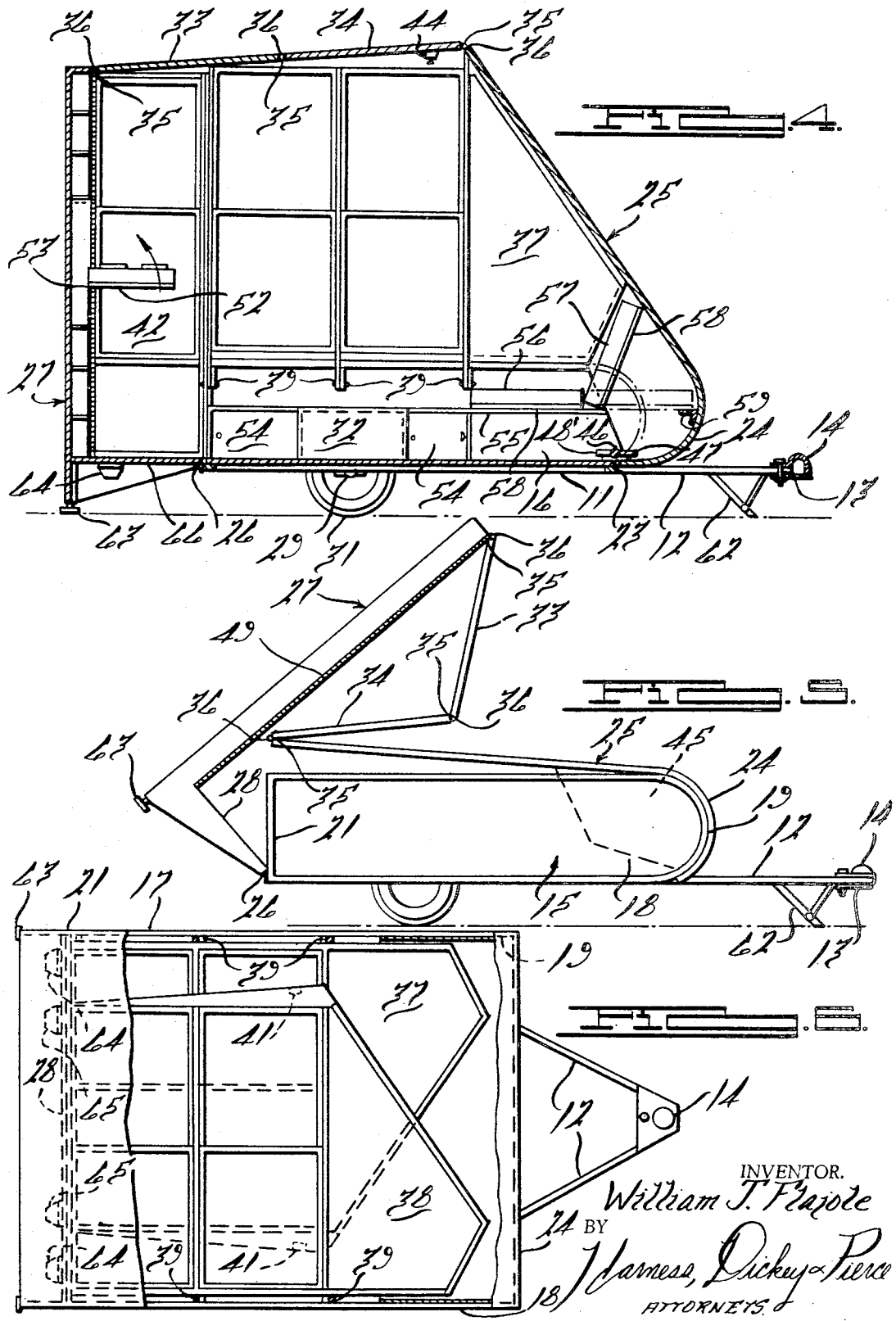

3,397,908
CAMPING TRAILER
William J. Flajole, 20650 Breezewood,
Southfield, Mich. 48075
Filed Sept. 1, 1966, Ser. No. 576,665
5 Claims. (Cl. 296—23)

ABSTRACT OF THE DISCLOSURE

The camping trailer has foldable panels which form the top and end cover portions in trailer and extended camping position. Hinged panels are hingedly connected to the ends of foldable panels to form the roof section of the trailer when in camping position.

---

The camping trailer of the present invention comprises a chassis frame having a front extension containing a socket for receiving a ball on a hitch carried by a pulling vehicle. A trailer body has a bottom and two side walls supported by the chassis frame. Closure members are pivoted at each end of the trailer bottom and these cover and protect the trailer ends and top when lowered into position for traveling. Two panels are pivoted together and to the adjacent edges of the closure members which when the closure members are swung outwardly span the area therebetween to form the roof of the camper. Two side wall sections are pivoted to the side walls of the trailer body to be swung upwardly in extension of the side walls and into engagement with the two top panels. A rectangular filler panel is pivoted lengthwise to one edge of the rear closure member and can be swung outwardly into engagement with its corresponding side wall section when the rear closure member is raised into position for camping, thus completing the wall on one side of the camper. A door is hinged lengthwise to the opposite edge of the rear closure member and provides ingress to the trailer when in camper position, closing against its corresponding side wall section. The trailer may also be provided with receptacles for clothes, medicine cabinet, a stove and the like. Supports are provided at the front end of the trailer body for box spring matress sections which may lay flat in double bed configuration or which may have one element in tilted position to form a seating structure at the front end of the trailer. Arrangement is made for a foldaway bed which when set up occupies a position on the trailer floor.

Accordingly, the main objects of the invention are: to provide a camper trailer with a trailer body having the front and rear closure elements hinged at the bottom so that they can be swung outwardly to form end walls with pivoted panel sections therebetween which then constitute the top roof portion of the camper; to provide wall extensions for the side walls of the trailer body which are hinged to the inner surface thereof and which swing upwardly in extension of the body wall into engagement with the top roof portion; to provide a camping trailer employing metal and glass panels which are hinged together into traveling and camping positions, and in general to provide a camping trailer which is simple in construction, readily expanded from trailer to camping positions, and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a view of a camper trailer embodying features of the present invention hitched to the rear of a pulling vehicle;

FIG. 2 is a view of the structure illustrated in FIG. 1, when expanded into camper position;

FIG. 3 is a sectional view of the structure illustrated in FIG. 2, taken on line 3—3 thereof;

FIG. 4 is a sectional view of the structure illustrated in FIG. 3, taken on line 4—4 thereof;

FIG. 5 is a view of the structure illustrated in FIG. 1, with the panels partially moved toward camper position, and FIG. 6 is a plan view of the structure illustrated in FIG. 1 when in carrying position.

The camper trailer of the present invention has a chassis frame 11 with converging front sections 12 which form a support 13 for receiving a ball socket 14. A trailer body 15 has a floor 16 which is secured to the chassis frame 11. An axle 29 is secured to the chassis frame 11 for supporting a pair of wheels 31 which are disposed within wheel housings 32 extending within the body 15. Side walls 17 and 18 are supported on the floor 16 with their front ends 19 terminating in an arc of 180° and their back ends 21 terminating in top and bottom corners of 90° each. A hinge 23 extends along the floor 16 between the front ends 19 of the side walls 17 and 18. The arcuate end 24 of the front trailer body closure panel 25 is pivoted by the hinge 23. The arcuate end 25 extends over and conforms with the arcuate front ends 19 of the side walls 17 and 18. A hinge 26 extends along the floor 16 between the back ends 21 of the side walls 17 and 18. A rear trailer body closure panel 27 is pivoted by the hinge 26. The perpendicular back end 28 extends over and conforms with the top and bottom corners of the side wall rear ends 21. Top panels 33 and 34 are pivoted to each other and to the front and rear closure panels 25 and 27 by means of piano-type hinges 35. With this arrangement the top panels 33 and 34 will be lowered as the closure panels are swung inward so as to rest upon closure panel 25 and beneath closure panel 27 when the trailer is in carrying position. The panels 33 and 34 will be raised as the closure panels 25 and 27 are swung outward so as to form a roof sloping slightly to the rear when the trailer is in camping position. Sealing strips 36 are provided between the panels 25, 27, 33 and 34 to form a watertight joint between the edges of hinges 35 when in camping position and in carrying position.

Left and right wall extensions 37 and 38 fill the space between the side walls 17 and 18 of the trailer body and the panels 25, 27, 33 and 34 when the trailer is in camping position. As illustrated in FIGS. 3 and 4, the wall extensions 37 and 38 are secured to the inner sides of their respective walls 17 and 18 by hinges 39 which are positioned sufficiently below the upper edges of the side walls to allow wall extension 37 to rest beneath wall extension 38 when lowered so that the front trailer body closure panel 25 can lie flush upon the upper edges of the side walls 17 and 18. When in the raised position, the wall extensions will provide support to and conform with the the panels 25, 27, 33 and 34, and can be attached thereto with a fastening means 41 such as a latch or bolt. The wall extensions 37 and 38 can be provided with any arrangement of windows and panels of such material as metal or plastic. A rectangular filler panel 42 is secured lengthwise by a hinge 43 to the left inside edge of the rear trailer body closure panel 27 and rests folded beneath the closure panel when in carrying position. When in camping position, the filler panel 42 is swung outward to abut the left side wall 17 and left wall extension 37 at their rear edges, and it can be attached thereto with a fastening means 44, thus completing the left wall. The arcuate end 24 of the front closure panel 25 is provided with permanently attached filler panels 45 which when lowered rest within the side walls 17 and 18 and when raised fill in the area at the front end of the trailer on each side to form there an extension of the arcuate end portions 19 of the side walls 17 and 18. A torsion bar 46 is mounted adjacent to the hinge 23 with one crank arm 47 engaging the arcuate portion 24 and the other crank arm 48′ engaging the floor 16 to which the elongated central part of the bar is secured. Upon the lowering of the front closure panel 25, movement of the arm 47 along the portion 24 tensions the bar so that a force will be exerted thereby when the closure panel 25 is raised. A door 48 is secured lengthwise by a piano-type hinge 49 to the right inside edge of the rear trailer body closure 27, and rests folded beneath the closure panel when in carrying position. When in camping position, the door 48 pivots to engage the right wall extension 38 and when opened allows a person to step into the camper on the floor 16. The door 48 may be held shut against the right wall extension 38 by a conventional door latch 51. Both the rectangular filler panel 42 and the door 48 can be provided with any arrangement of windows and panels of such material as metal or plastic.

The rear closure panel 27 supports a sink and cooking stove 52 which pivots upward and downward on hinge 53 for use as needed. Storage cabinets 54 are provided on each side of the left wheel housing 42 inside the trailer body. A support 55 is mounted on the inner surface of each side wall 17 and 18 for two foam or spring pads 56 and 57, each pad having a solid back 58. When in seating arrangement, the pad 57 is in seat-back position, as illustrated in FIG. 4. When the pads 56 and 57 are employed as a bed, the pad 56 moves out to permit the pad 57 to drop down and rest upon the support 55 and upon an angle frame member 59 secured to the arcuate end 24 of the front trailer body closure panel 25. A foldaway bed 61 may be set up on the floor 16 for sleeping or may be folded and stored beneath the support 55 when not in use. An outrigger 62 is mounted on the front end of the chassis frame for stabilizing the camper when separated from the automobile. A screw-type leveler 63 is mounted at the upper rear corner on each side of the rear closure panel 27, and these also serve for stabilizing the trailer in camping position. Brake lights 64 and reflectors 65 are mounted on the back end 28 of the rear closure panel 27. It will be noted in FIG. 1 that a pull bar 66 extends rearwardly from an automobile having a ball thereon (not shown) which is received by the socket 14 at the forward end of the chassis frame. A locking bar (not shown) is swung about the neck below the ball to releasably secure the chassis frame to the pull bar 66.

What is claimed is:

1. In a camper trailer, a body having a bottom and side walls, wheels supporting said body, overlapping top panels enclosing the top of said body when the trailer is in carrying position, said top panels enclosing the front and rear ends of the side walls when the trailer is in camping position, and a pair of panels hinged to each other and to the ends of the top panels for forming the roof with the end walls when the trailer is in camping position.

2. In a camper trailer as recited in claim 1, wherein the top panels overlap each with the hinged panels therebetween when enclosing the top of the body when the trailer is in carrying position.

3. In a camper trailer as recited in claim 1, wherein wall extensions are pivoted to the side walls of the trailer for movement from a horizontal nested overlapped relation within the trailer body to a vertical position in extensions of the trailer side walls and in engagement with said two panels.

4. In a camper trailer as recited in claim 1, wherein spring means are employed for assisting in raising the top closure panels and the hinged panels therebetween.

5. In a camper trailer as recited in claim 1, wherein a door is hinged to one of said top closure panels to engage the corresponding side wall and wall extension when the trailer is in camper position.

References Cited
UNITED STATES PATENTS

| | | | |
|---|---|---|---|
| 2,119,154 | 5/1938 | Downing | 296—23 |
| 2,686,075 | 8/1954 | Steiner | 296—23 |
| 2,890,907 | 6/1959 | Briskie et al. | 296—23 |
| 3,288,521 | 5/1964 | Patnode | 296—23 |

FOREIGN PATENTS

| | | |
|---|---|---|
| 932,458 | 11/1947 | France. |
| 1,115,416 | 1/1956 | France. |

KENNETH H. BETTS, *Primary Examiner.*